(12) United States Patent
Lee et al.

(10) Patent No.: US 8,308,947 B2
(45) Date of Patent: Nov. 13, 2012

(54) METHODS OF PROVIDING AN AEROBIC MEDIUM IN A WASTEWATER TREATMENT BIOREACTOR COMPARTMENT

(75) Inventors: George Jaw Fang Lee, Berwyn, PA (US); Matthew J. Gray, Allentown, PA (US); Steven M. Kestel, Norristown, PA (US)

(73) Assignee: BioChem Technology, Inc., King of Prussia, PA (US)

( * ) Notice: Subject to any disclaimer, the term of this patent is extended or adjusted under 35 U.S.C. 154(b) by 405 days.

(21) Appl. No.: 12/693,776

(22) Filed: Jan. 26, 2010

(65) Prior Publication Data
US 2010/0187173 A1 Jul. 29, 2010

Related U.S. Application Data

(60) Provisional application No. 61/147,612, filed on Jan. 27, 2009.

(51) Int. Cl.
*C02F 3/00* (2006.01)
(52) U.S. Cl. ........................ 210/620; 210/739
(58) Field of Classification Search .......... 210/620–626, 210/739
See application file for complete search history.

(56) References Cited

U.S. PATENT DOCUMENTS
7,449,113 B2 * 11/2008 Jenkins et al. ................ 210/603
* cited by examiner

*Primary Examiner* — Chester Barry
(74) *Attorney, Agent, or Firm* — DLA Piper LLP (US)

(57) ABSTRACT

The disclosure relates to methods and related systems for monitoring and controlling biological activity in municipal and industrial wastewater treatment systems. In particular, the disclosure relates to methods for controlling airflow in a bioreactor type, activated sludge wastewater treatment system by real-time monitoring of one or more parameters of the wastewater treatment system.

20 Claims, 7 Drawing Sheets

METHODS OF PROVIDING AN AEROBIC MEDIUM IN A WASTEWATER TREATMENT BIOREACTOR COMPARTMENT

RELATED APPLICATION

This application claims the benefit of U.S. Patent Application No. 61/147,612, filed Jan. 27, 2009.

TECHNICAL FIELD

The disclosure relates to methods and systems for monitoring and controlling biological activity in municipal and industrial wastewater treatment systems. In particular, the disclosure relates to methods for controlling air-flow in a bioreactor type, activated sludge wastewater treatment system by real-time monitoring of one or more parameters of the wastewater treatment system.

BACKGROUND

There a number of different systems designed to purify wastewater produced by industry and municipal sources. Activated sludge wastewater treatment plants (WWTPs) are a type of biological reactor (bioreactor) system which are commonly used to treat industrial and municipal wastewater.

Various activated sludge processes are currently used in wastewater treatment plants to facilitate degradation of contaminants. In most wastewater treatment plants employing activated sludge either suspensions of activated sludge or fixed films of activated sludge are used to facilitate degradation of contaminants. Typically, activated sludge processes use aerobic, anoxic and anaerobic zones depending upon the desired level of treatment. The aerobic, anoxic and anaerobic zones perform important functions in the treatment process.

In the aerobic zones present in the activated sludge process stream, oxygen is often supplied by sparging air into the wastewater stream at an airflow rate sufficient to maintain a given dissolved oxygen level. In the aerobic zone, nitrifying autotrophic microbes capable of using $NH_4^+$ (ammonia) as their energy source convert ammonia to nitrite then to nitrate and heterotrophic microbes consume available carbon in the water phase.

Anoxic zones are also present in the activated sludge process stream. Such anoxic zones lack dissolved oxygen. In the anoxic zones, denitrifying heterotrophic microbes utilize nitrate and nitrite as electron acceptors and can reduce the amount of nitrogen present in the water. Denitrifying heterotrophic microbes also consume some of the available carbon during the denitrification process. During denitrification, "$NO_x$" species are reduced stepwise from $NO_3$ (nitrate)→$NO_2$ (nitrite)→$NO$ (nitric oxide)→$N_2O$ (nitrous oxide)→$N_2$ to nitrogen gas which is ultimately released to the atmosphere. In a typical activated sludge process, nitrate for denitrification is often supplied by providing wastewater to the beginning of the anoxic stage.

Anaerobic zones are also present in the activated sludge process stream. Anaerobic zones lack dissolved oxygen, nitrate and nitrite. In the anaerobic zones, a portion of an available carbon source in the wastewater is removed by polyphosphate forming microorganisms during their growth and, in turn, inorganic phosphate ($PO_4^-$) is released into water. This rapid uptake and storage of available carbon by polyphosphate forming microorganisms in the anaerobic zones insures phosphate removal later in the anoxic and aerobic zones of the process stream.

Importantly, the amount of airflow to maintain a given amount of dissolved oxygen in the aerobic zones of the biological reactor is not constant. This is because the load of organic nitrogen and carbon compounds in the materials in the wastewater stream entering the activated sludge process stream is not constant. For example, there are diurnal fluctuations in the municipal wastewater stream such that at night the loading levels are lower, but during the daytime loading levels are higher. In fact, clear hourly trends in municipal wastewater loading levels can be seen which correlate to municipal water usage during waking hours (e.g. shower and other bathroom usage). Similarly, there are seasonal fluctuations in the amount of dissolved oxygen available which is, in part, a function of water temperature as well as decreased microbial activity at lower temperatures and increased microbial activity at high temperatures as well as a number of other variables.

Altogether, this means that the dynamics of a typical wastewater treatment system are non-linear and vary over time. These fluctuations may result in insufficient control of the dissolved oxygen (DO) concentration in the aerobic zones depending on the circumstances.

A number of different parameters of activated sludge wastewater treatment processes can be monitored. These parameters include biological oxygen demand (BOD), chemical oxygen demand (COD), nitrogen levels measured as total Kjeldahl nitrogen (TKN), nitrate levels ($NO_3$), nitrite levels ($NO_2$), phosphorous levels measured as inorganic phosphate ($PO_4^-$) as well as other parameters such as total suspended solids, temperature, and pH. A number of these parameters such as airflow rates, dissolved oxygen concentrations, medium flow rates, mixed liquor suspended solids concentrations, $NH_4^+$ concentrations and temperature can be monitored in real-time using automated instrumentation Aeration control systems provide a supply of oxygen in aerobic zones to meet constantly changing oxygen demands of wastewater treatment systems. A typical aeration system contains blowers and air control valves to regulate airflow rates and the sparging of air to maintain a given dissolved oxygen level. However, oxygen can also be provided by means of other gases (e.g. compressed gases such as pure oxygen). Conventional aeration control systems use readings from a dissolved oxygen sensor with a proportional-integral controller to determine the desired change in airflow needed from the aeration system to restore the predetermined, user-selected dissolved oxygen set point when deviations from this set point occur (e.g. airflow is increased after too little dissolved oxygen is sensed). FIG. 1 depicts a conventional bioreactor based wastewater treatment system and conventional aeration control system.

Although a large spectrum of activated sludge wastewater treatment process parameters can be monitored to provide a wealth of information, effectively utilizing this information to maximize activated sludge process efficiency presents a difficult problem. This means that conventional techniques of aeration control result in unnecessarily high energy consumption and poor wastewater treatment efficiency. Thus, a need exists for methods of selecting airflow rates to maintain a desired dissolved oxygen level in the aerobic zone of a wastewater treatment process stream such that excessive energy is not consumed and high treatment efficiency is maintained. In other words, there is a need for methods of providing an aerobic medium in a bioreactor compartment and systems that perform such methods.

SUMMARY

We thus provide methods for providing an aerobic medium in a bioreactor compartment comprising a) measuring the $NH_4^+$ concentration, dissolved oxygen concentration, medium flow rate, and mixed liquor suspended solids of the medium in the compartment and the airflow into the compartment; b) selecting reference values for the $NH_4^+$ concentration, dissolved oxygen concentration, medium flow rate and mixed liquor suspended solids of the medium in the compartment and the airflow into the compartment; c) selecting a reference time period; d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment; e) comparing the reference value for the dissolved oxygen concentration and the airflow into the compartment to the measured dissolved oxygen concentration and airflow into the compartment if the measured $NH_4^+$ concentration, medium flow rate, and mixed liquor suspended solids for the medium in the compartment are not equal to the reference value for the $NH_4^+$ concentration, medium flow rate, and mixed liquor suspended solids for the medium in the compartment; f) determining the airflow set point value for the compartment, if the reference values for the dissolved oxygen concentration and the airflow into the compartment and the measured dissolved oxygen concentration and airflow into the compartment are equal, according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period; and g) adjusting the airflow into the compartment to be equal to the airflow set point value; whereby an aerobic medium is provided in the bioreactor compartment.

We also provide methods for providing an aerobic medium in a bioreactor compartment comprising: a) measuring the $NH_4^+$ concentration, dissolved oxygen concentration, medium flow rate, and mixed liquor suspended solids of the medium in the compartment and the airflow into the compartment; b) selecting reference values for the $NH_4^+$ concentration, dissolved oxygen concentration, medium flow rate and mixed liquor suspended solids of the medium in the compartment and the airflow into the compartment; c) selecting a reference time period; d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment; e) comparing the reference value for the dissolved oxygen concentration and the airflow into the compartment to the measured dissolved oxygen concentration and airflow into the compartment if the measured $NH_4^+$ concentration, medium flow rate, and mixed liquor suspended solids for the medium in the compartment are not equal to the reference value for the $NH_4^+$ concentration, medium flow rate, and mixed liquor suspended solids for the medium in the compartment; f) determining the airflow set point value for the compartment, if the reference values for the dissolved oxygen concentration and the airflow into the compartment and the measured dissolved oxygen concentration and airflow into the compartment are equal, according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period; and g) adjusting the airflow into the compartment to be equal to the airflow set point value; whereby an aerobic medium is provided in the bioreactor compartment.

We further provide methods for providing an aerobic medium in a bioreactor compartment comprising a) measuring the $NH_4^+$ concentration, dissolved oxygen concentration, medium flow rate, and mixed liquor suspended solids of the medium in the compartment and the airflow into the compartment; b) selecting reference values for the $NH_4^+$ concentration, dissolved oxygen concentration, medium flow rate and mixed liquor suspended solids of the medium in the compartment and the airflow into the compartment; c) selecting a reference time period; d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment; e) comparing the reference value for the dissolved oxygen concentration and the airflow into the compartment to the measured dissolved oxygen concentration and airflow into the compartment if the measured $NH_4^+$ concentration, medium flow rate, and mixed liquor suspended solids for the medium in the compartment are equal to the reference value for the $NH_4^+$ concentration, medium flow rate, and mixed liquor suspended solids for the medium in the compartment; f) determining a first airflow set point value for the compartment, if the reference values for the dissolved oxygen concentration and the airflow into the compartment and the measured dissolved oxygen concentration and airflow into the compartment are equal, according to the formula:

$$Airflow_{fb,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment, if the reference values for the dissolved oxygen concentration and the airflow into the compartment and the measured dissolved oxygen concentration and airflow into the compartment are equal, according to the formula:

$$Airflow_{fb,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period; g) determining a third airflow set point value for the compartment, if the reference values for the dissolved oxygen concentration and the airflow into the compartment and the measured dissolved oxygen concentration and airflow into the compartment are equal, according to the formula:

$$Airflow_{ff,i} = \frac{Airflow_{cur,i} \cdot (\beta \cdot C_s - DO_{cur,i})}{(\beta \cdot C_s - DO_{sp,i})} \cdot \frac{OUR_{pred,i}}{OUR_{current,i}}$$

h) determining the airflow set point value for the compartment using the weighted sum of $Airflow_{fb,i}$ and $Airflow_{ff,i}$; and i) adjusting the airflow into the compartment to be equal to the airflow set point value; whereby an aerobic medium is provided in the bioreactor compartment.

We still further provide methods for providing an aerobic medium in a bioreactor compartment comprising a) measuring the $NH_4^+$ concentration, dissolved oxygen concentration, medium flow rate, and mixed liquor suspended solids of the medium in the compartment and the airflow into the compartment; b) selecting reference values for the $NH_4^+$ concentration, dissolved oxygen concentration, medium flow rate and mixed liquor suspended solids of the medium in the compartment and the airflow into the compartment; c) selecting a reference time period; d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment; e) selecting either the performance of step f) if the reference values for the $NH_4^+$ concentration, medium flow rate, and mixed liquor suspended solids for the medium in the compartment are not equal to the measured $NH_4^+$ concentration, medium flow rate, and mixed liquor suspended solids for the medium in the compartment or the performance step g) if the reference values for the $NH_4^+$ concentration, medium flow rate, and mixed liquor suspended solids for the medium in the compartment are equal to the measured $NH_4^+$ concentration, medium flow rate, and mixed liquor suspended solids for the medium in the compartment; and f) comparing the reference value for the dissolved oxygen concentration and the airflow into the compartment to the measured dissolved oxygen concentration and airflow into the compartment and, if the reference values for the dissolved oxygen concentration and the airflow into the compartment and the measured dissolved oxygen concentration and airflow into the compartment are equal, determining a first airflow set point value for the compartment according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period, and adjusting the airflow into the compartment to be equal to the first airflow set point when the reference value for the dissolved oxygen concentration in the compartment is unchanged during the reference time period or to be equal to the second airflow set point when the reference value for the dissolved oxygen concentration in the compartment has changed during the reference time period; or g) comparing the reference value for the dissolved oxygen concentration and the airflow into the compartment to the measured dissolved oxygen concentration and airflow into the compartment and, if the reference values for the dissolved oxygen concentration and the airflow into the compartment and the measured dissolved oxygen concentration and airflow into the compartment are equal, determining a first airflow set point value for the compartment according to the formula:

$$Airflow_{fb,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment according to the formula:

$$Airflow_{fb,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period, and determining a third airflow set point value for the compartment according to the formula:

$$Airflow_{ff,i} = \frac{Airflow_{cur,i} \cdot (\beta \cdot C_s - DO_{cur,i})}{(\beta \cdot C_s - DO_{sp,i})} \cdot \frac{OUR_{pred,i}}{OUR_{current,i}}$$

and determining a fourth airflow set point value for the compartment using the weighted sum of $Airflow_{fb,i}$; and $Airflow_{ff,i}$; when the reference value for the dissolved oxygen concentration in the compartment has changed during the reference time period, and adjusting the airflow into the compartment to be equal to the fourth airflow set point value; whereby an aerobic medium is provided in the bioreactor compartment.

Another aspect of the disclosure is a method for providing an aerobic medium in a bioreactor compartment comprising a) determining the airflow set point value for the compartment according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})};$$

and b) adjusting the airflow into the compartment to be equal to the airflow set point value; whereby an aerobic medium is provided in the bioreactor compartment. An example of this aspect of the disclosure is shown on the right side of FIG. 5.

We also provide methods for providing an aerobic medium in a bioreactor compartment comprising a) determining the airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})};$$

and b) adjusting the airflow into the compartment to be equal to the airflow set point value; whereby an aerobic medium is provided in the bioreactor compartment. An example of this aspect of the disclosure is shown on the left side of FIG. 5.

We yet further provide methods for providing an aerobic medium in a bioreactor compartment comprising: a) determining the airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})};$$

and b) adjusting the airflow into the compartment to be equal to the airflow set point value;

whereby an aerobic medium is provided in the bioreactor compartment.

We also provide methods for providing an aerobic medium in a bioreactor compartment comprising a) measuring the dissolved oxygen concentration of the medium in the compartment; b) selecting a reference value for the dissolved oxygen concentration of the medium in the compartment; d) selecting a reference time period; e) comparing the reference value for the dissolved oxygen concentration to the measured dissolved oxygen concentration of the medium in the compartment; f) determining a first airflow set point value for the compartment according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period; and g) adjusting the airflow into the compartment to be equal to the first airflow set point value when the reference value for the dissolved oxygen concentration in the compartment is unchanged during the reference time period, or adjusting the airflow into the compartment to be equal to the first airflow set point value when the reference value for the dissolved oxygen concentration in the compartment has changed during the reference time period; whereby an aerobic medium is provided in the bioreactor compartment.

Another aspect of the disclosure is a method for providing an aerobic medium in a bioreactor compartment comprising the steps of a) selecting reference values for the dissolved oxygen concentration and the airflow into the compartment; b) selecting a predetermined airflow value sufficient to maintain an aerobic medium; c) measuring the dissolved oxygen concentration and airflow into the compartment; d) comparing the reference values for the dissolved oxygen concentration and the airflow into the compartment to the measured dissolved oxygen concentration and airflow into the compartment; e) adjusting the airflow into the compartment to be equal to the predetermined airflow value if the reference values for the dissolved oxygen concentration and the airflow into the compartment, and the measured dissolved oxygen concentration and airflow into the compartment are not equal; whereby an aerobic medium is provided in the bioreactor compartment.

We provide methods for providing an aerobic medium in a bioreactor compartment comprising a) determining an airflow set point value according to the formula: $Airflow_{sp} = w_1 \cdot Airflow_{M1} + w_2 \cdot Airflow_{M2} + w_3 \cdot Airflow_{M3} + w_4 \cdot Airflow_{sp, default}$; and b) adjusting the airflow into the compartment to be equal to $Airflow_{sp}$; whereby an aerobic medium is provided in the bioreactor compartment.

We further provide methods for providing an aerobic medium in a bioreactor compartment comprising a) determining an airflow set point according to the formula $$Airflow_{sp} = Airflow_{current} \cdot \frac{\beta \cdot C_s - DO_{current}}{\beta \cdot C_s - DO_{sp}} \cdot \left(\frac{OUR_{predicted}}{OUR_{current}}\right); \text{ and}$$

b) adjusting the airflow into the compartment to be equal to the airflow set point value; whereby an aerobic medium is provided in the bioreactor compartment.

Figure 1:
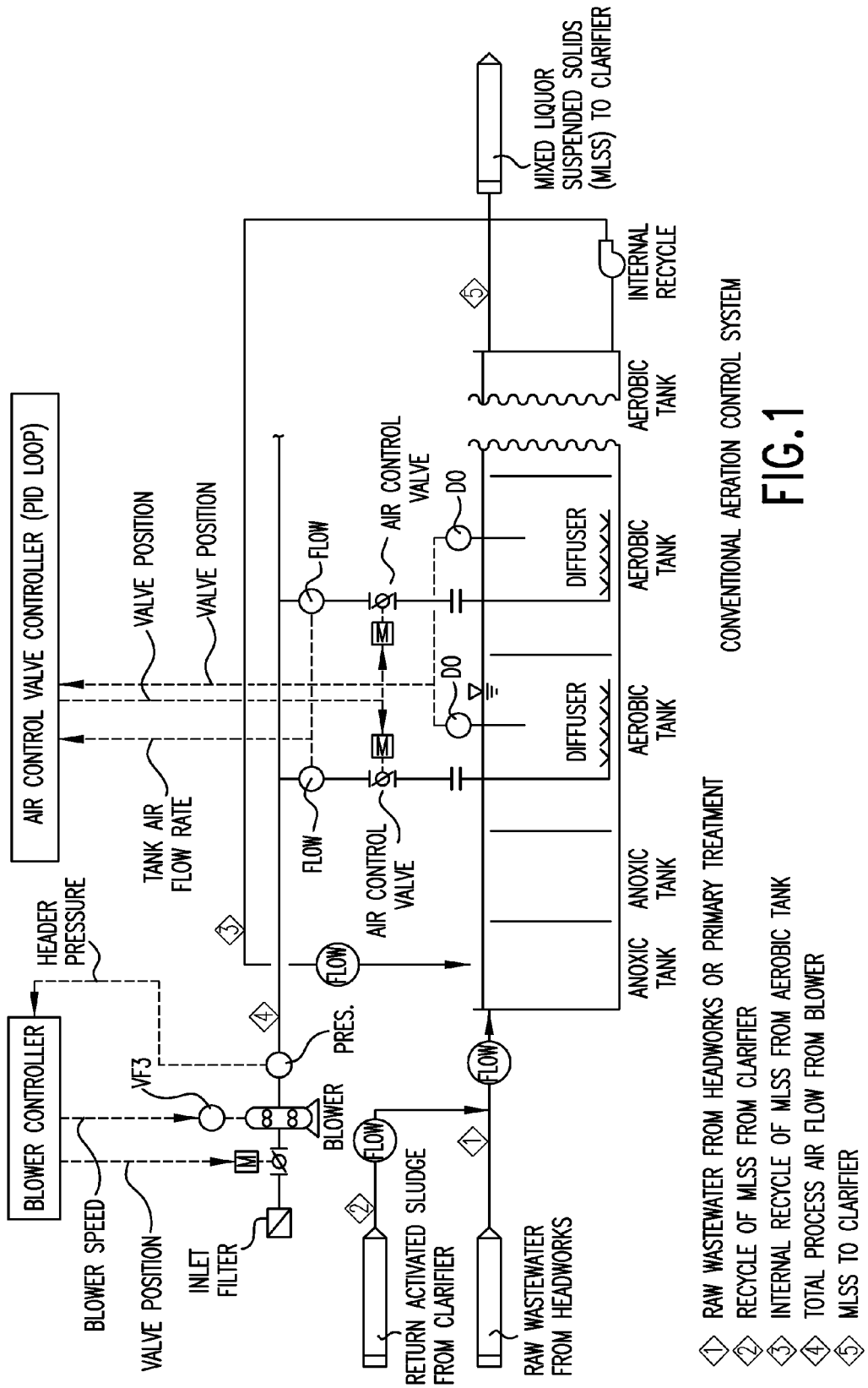
FIG. 1 shows a schematic for a conventional aeration control system in a bioreactor based wastewater treatment system.

The figures use standard engineering conventions to describe the systems and methods shown therein.

DETAILED DESCRIPTION

It will be appreciated that the following description is intended to provide details concerning specific representative aspects of the disclosure. It will also be appreciated that a wide variety of equivalents may be substituted for the specified elements of the methods and systems described herein without departing from the spirit and scope of this disclosure as described in the appended claims. Additionally, all publications, including but not limited to patents and patent applications, cited in this disclosure are herein incorporated by reference as though fully set forth.

The term "aerobic medium" as used herein means a fluid which provides nutrients to an organism in contact with the fluid and which contains sufficient oxygen to support the aerobic respiration, or another metabolic process in which oxygen is a terminal electron acceptor, of an organism in contact with the fluid. Such media include but are not limited to aqueous solutions and complex, heterogeneous media having the flow characteristics of a fluid, but which also comprise solids.

The term "bioreactor" as used herein means an apparatus in which an organism, or portion thereof, such as a metabolically active organelle or membrane comprising fragment of an organism, catalyzes at least one chemical reaction. A wastewater treatment system is one example of a bioreactor.

The term "compartment" as used herein means a section or zone into which the process stream in a bioreactor has been divided or merely identified or labeled as such. Such compartments can be in fluid communication (direct or indirect) with another compartment of a bioreactor. For example, a compartment can be a first container or tank that can be partially, or entirely physically separated from a second compartment, but comprises pipes or other means for fluid communication with a second compartment. Alternatively, a compartment can be a zone in a first area that is distinct from surrounding or adjoining areas on the basis that the medium in the zone contains a particular oxygen concentration, such that the media can support aerobes or anaerobes, or on the basis that the organisms found in the zone are predominately of a particular type, such as aerobes or anaerobes. Such zone type compartments can be partially, or entirely physically separated from another zone, but often are not physically separated from other adjacent zone type compartments.

The term "mixed liquor suspended solids" as used herein means the concentration of suspended solids in the mixed liquor fluid medium of a bioreactor compartment. Mixed liquor suspended solids (MLSS) measurements are used as a measure of the concentration of microorganisms present in a medium and can be determined by a variety of standard methods and instruments well known to those of ordinary skill in the art.

The term "reference value" as used herein means an individual value, or range of values, corresponding to a desired operating parameter for a bioreactor compartment. Reference values can be selected based on the operating characteristics and design of a particular system comprising a bioreactor compartment, such as a wastewater treatment system. In the context of a bioreactor based wastewater treatment system, such values are typically those necessary to maintain a particular treated effluent water quality (e.g. mandated concentrations of $NO_3^-$ in effluent water).

The term "reference time period" as used herein means the value of a user selected time interval corresponding to the time that has elapsed since a particular aspect of the medium in a bioreactor compartment, such as dissolved oxygen, was last measured.

Our methods provide an aerobic medium in a bioreactor compartment comprising a) measuring the $NH_4^+$ concentration, dissolved oxygen concentration, medium flow rate, and mixed liquor suspended solids of the medium in the compartment and the airflow into the compartment; b) selecting reference values for the $NH_4^+$ concentration, dissolved oxygen concentration, medium flow rate and mixed liquor suspended solids of the medium in the compartment and the airflow into the compartment; c) selecting a reference time period; d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment; e) comparing the reference value for the dissolved oxygen concentration and the airflow into the compartment to the measured dissolved oxygen concentration and airflow into the compartment if the measured $NH_4^+$ concentration, medium flow rate, and mixed liquor suspended solids for the medium in the compartment are not equal to the reference value for the $NH_4^+$ concentration, medium flow rate, and mixed liquor suspended solids for the medium in the compartment; f) determining the airflow set point value for the compartment, if the reference values for the dissolved oxygen concentration and the airflow into the compartment and the measured dissolved oxygen concentration and airflow into the compartment are equal, according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

-continued and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period; and g) adjusting the airflow into the compartment to be equal to the airflow set point value; whereby an aerobic medium is provided in the bioreactor compartment. An example of this aspect of the disclosure is shown in the upper right side of FIG. 3 and the right side of FIG. 4.

Importantly, the methods and their steps can be performed on at least one computer including, for example, a personal computer or programmable logic controller. Such a computer may be part of a network of computers or computer controlled devices. The calculated and measured values from the steps of the method may also be displayed by a computer controlled display means such as a computer controlled video display or computer controlled printer. The methods of the disclosure and steps of the disclosed methods may also be tied to a bioreactor system, such as a wastewater treatment system. Additionally, the methods of the disclosure are useful for transforming or changing the medium in a bioreactor compartment such that an aerobic medium is provided.

Figure 3A:
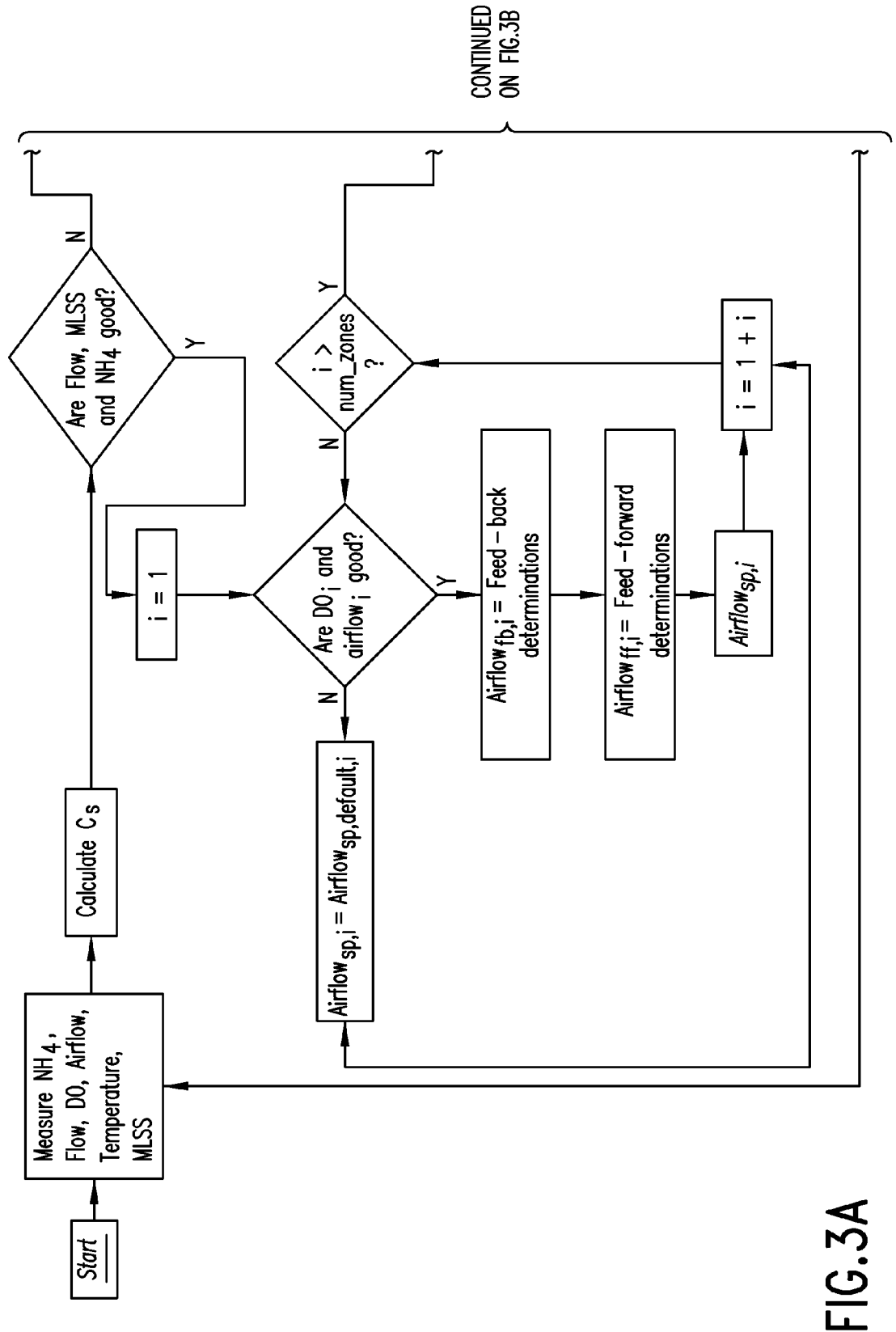
FIG. 3 shows a method of the disclosure for providing an aerobic medium in a bioreactor compartment of a system comprising multiple aerobic bioreactor compartments.
Figure 3B:
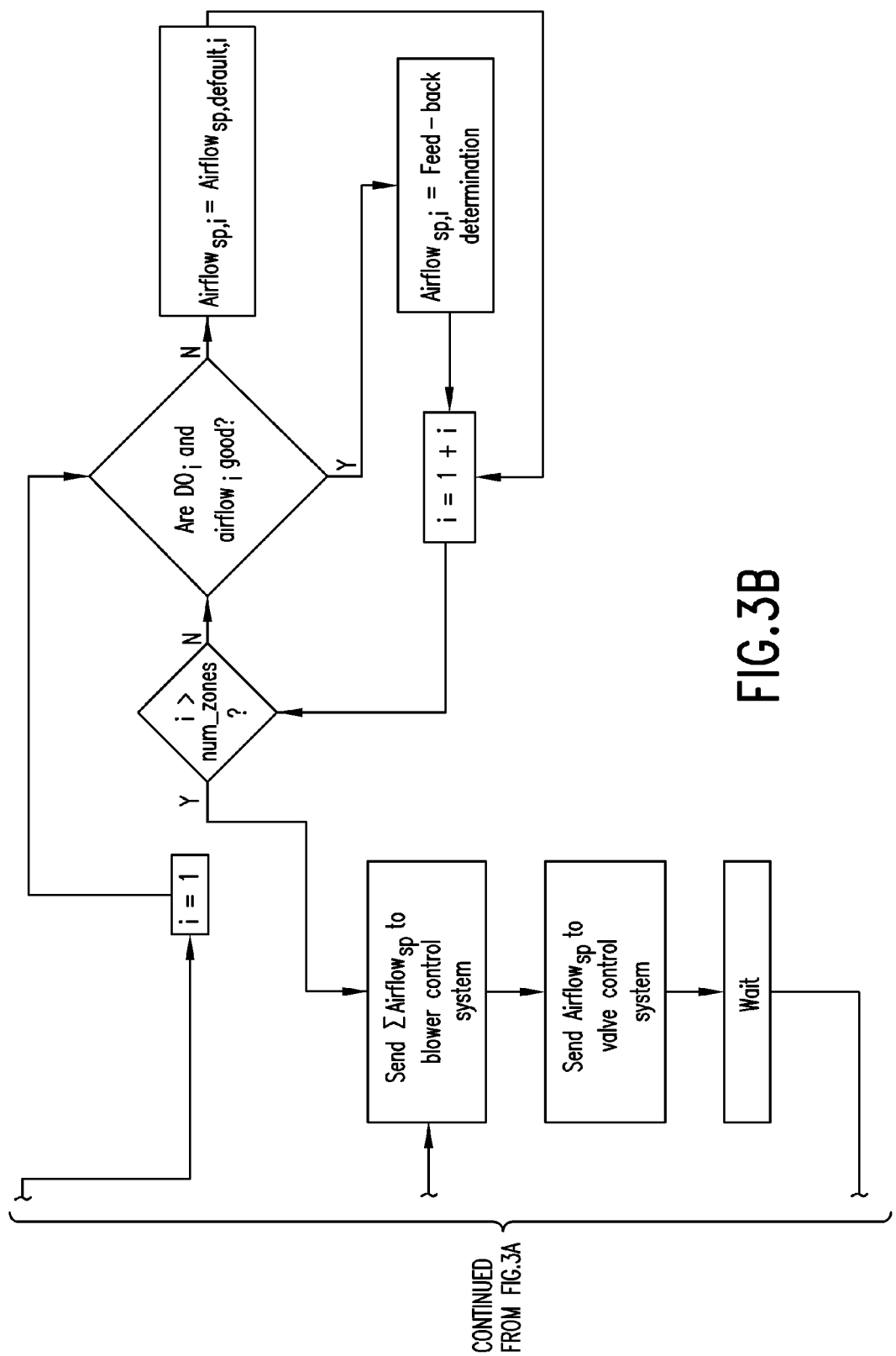
Figure 4:
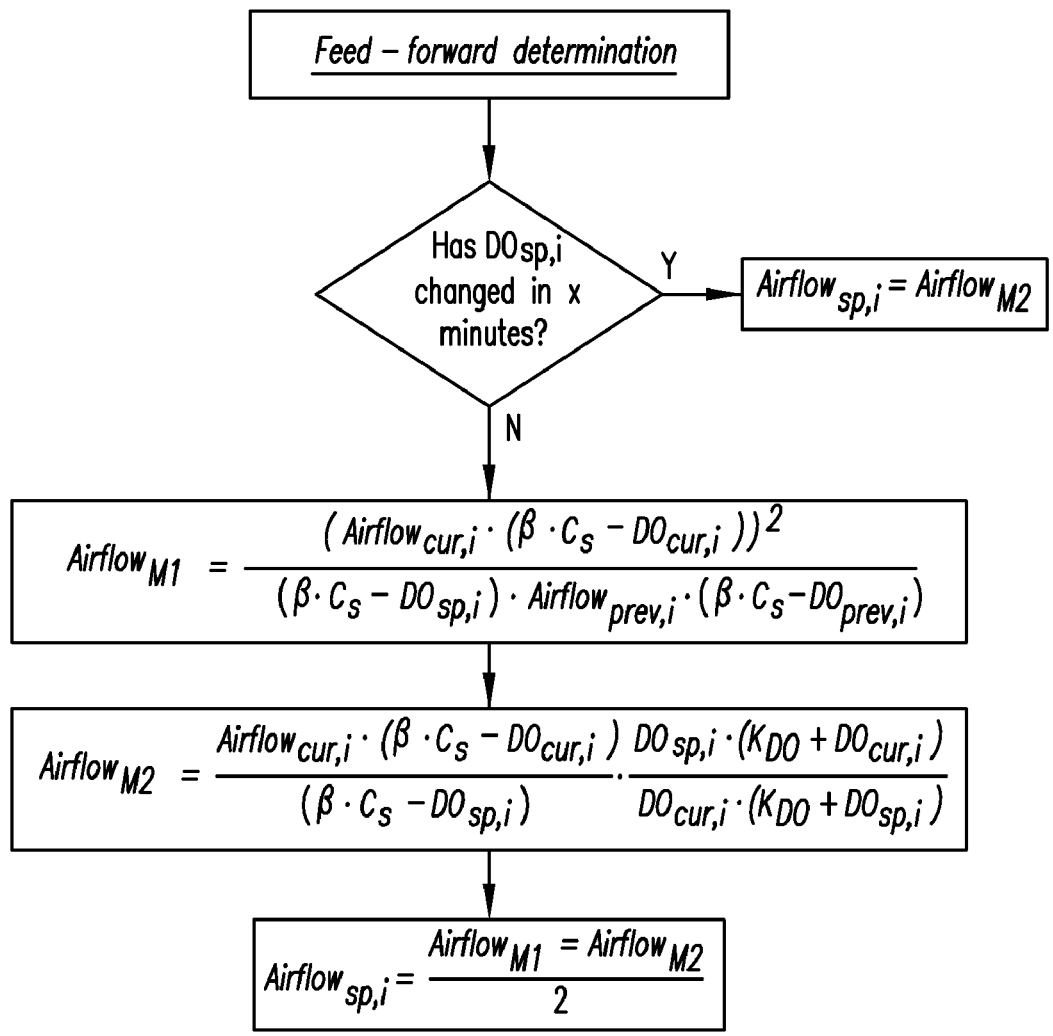
FIG. 4 shows a method of the disclosure for feed-back based determination of $Airflow_{sp,i}$ for providing an aerobic medium in a bioreactor compartment of a system comprising multiple aerobic bioreactor compartments.
Figure 5:
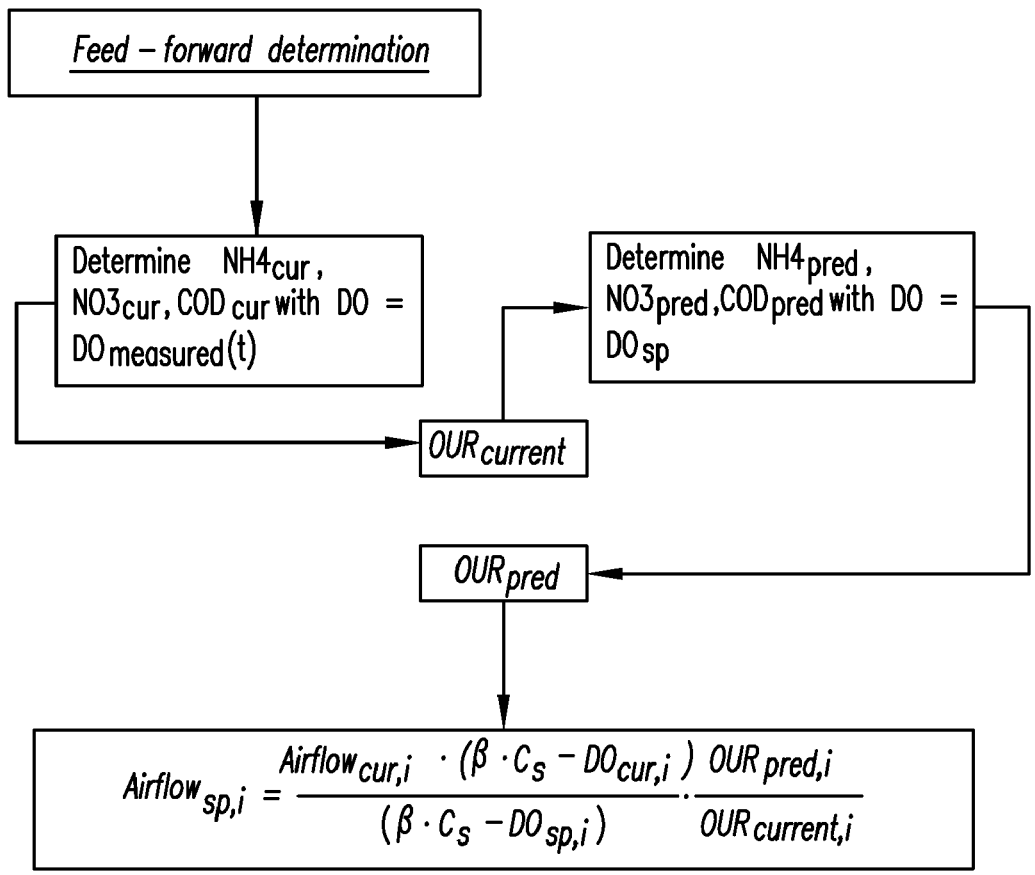
FIG. 5 shows a method of the disclosure for feed-back/feed-forward based determination of $Airflow_{sp,i}$ for providing an aerobic medium in a bioreactor compartment of a system comprising multiple aerobic bioreactor compartments.

In the methods of the disclosure it is necessary to provide values for the various terms present in the formulas utilized in these methods. As shown in FIGS. 3, 4 and 5 this may utilize the measurement of values such as temperature, $NH_4^+$ concentration, dissolved oxygen concentration, medium flow rate, and mixed liquor suspended solids of the medium and conversion of these values such that they are expressed with appropriate units. The value of the $C_S$ term, for example, may utilize the measurement of "T." Other values are inputted by a user and can be based on user selected values, constants, and correction factors as appropriate for a particular system comprising a bioreactor compartment. Measured values inputted and utilized in the formulas and methods of the disclosure can be measured using automated instrumentation placed in contact with the bioreactor process stream. This instrumentation can be placed upstream of an individual bioreactor compartment, at locations within a particular bioreactor compartment, or at multiple, combined locations within a bioreactor system and its process stream as may be necessary, or appropriate for a particular system. Calculated values are also described in FIGS. 3, 4 and 5. A more detailed discussion of the various terms present in the formulas utilized in the methods of the disclosure and other values utilized in the methods is provided below. Those of ordinary skill in the art will recognize appropriate units for values in the methods of the disclosure and that, when necessary, conversion of these values to other appropriate units can be performed.

$C_s$=adjusted oxygen saturation concentration (mg/L). Typically such values are from 0 to 1. $C_s$ can be determined using methods well known in the art.

$\beta$=Wastewater oxygen saturation correction factor. Appropriate values for this term can be selected on the basis of datasets that are well known in the art. Typically such values are from about 0.95 to 0.99.

$DO_{sp}$=Dissolved oxygen set point for each zone (mg/L). This is a user selected reference value for a bioreactor compartment. This value is normally somewhere in the range of from 0 mg/L to about 1.2 mg/L for a typical wastewater treatment plant.

$K_{DO}$=Oxygen half saturation concentration (mg/L). Appropriate values for this term can be selected on the basis of datasets that are well known in the art. Typical values from this term are from about 0.3 mg/L to 0.5 mg/L. Alternatively, this constant can be empirically determined for a bioreactor system, such as a particular wastewater treatment system, using methods well known in the art. $K_{DO}$ is an estimate of the oxygen half saturation concentration for an entire bioreactor system, while $K_{O,A}$ and $K_{O,H}$ are specific to the oxygen half saturation concentration for autotrophs and heterotrophs respectively.

num_zones=Total number of aeration zones (unitless). This value is an integer equal to the number of bioreactor compartments present in a system to which the methods of the disclosure will be applied.

x=Time to wait for constant DO set point (minutes). This is a user selected value for a reference time period. The value of this user selected time interval corresponds to the time that has elapsed since the dissolved oxygen in the medium of a bioreactor compartment was last measured. Typically this value is from 30 minutes to 60 minutes, but can be outside this range depending on the parameters of a given bioreactor system.

DO=Dissolved oxygen concentration (mg/L). This is a measured value. For a typical wastewater treatment plant, the dissolved oxygen level in a compartment is typically from 0 to about 12 mg/L. This latter value can represent the dynamic upper limit of most instrumentation used to measure dissolved oxygen and, if exceeded, indicates a dissolved oxygen value is not good because the instrument is out of range and presumably malfunctioning. Dissolved oxygen can be measured using standard methods and equipment well known to those of ordinary skill in the art. Dissolved oxygen can also be measured using any number of commercially available oxygen electrodes as well as devices utilizing optical principles for their operation.

Flow=Process flow rate (MGD; million gallons per day). This is a measured value. For a typical wastewater treatment plant, the flow through a compartment can be from 10,000 gallons per day (0.01 MGD) to 500,000,000 gallons per day (500 MGD), although this varies depending on the design and operating parameters of a particular wastewater treatment plant. Flow can also be measured as the sum of the influent flow rates and return flow rates into a bioreactor compartment. Flow of a medium in a bioreactor can be measured by a flow meter, or any other device that can provide the flow rate, or mass rate, of a fluid such as a liquid within a channel or pipe. In the wastewater treatment industry, for example, the most common liquid flow meter is a magnetic flow meter.

MLSS=Mixed Liquor Suspended Solids Concentration (mg/L). This is a measured value. For a typical wastewater treatment plant, the MLSS value in the medium can be from 10 mg/L to 5000 mg/L. This value can be empirically determined using methods and equipment well known in the art. In most instances, the actual measured MLSS in each compartment identified by "i" should be used.

$NH_4$=Ammonia ($NH_4^+$) concentration (mg/L). This is a measured value. This value can be measured in real-time in the process stream by using methods and equipment well known in the art. Ammonium can also be measured using devices utilizing colorimetric and ultraviolet (UV) absorbance or multiple wavelength UV absorbance spectrophotometeric principles for their operation. Importantly, in the art the term "ammonia" and "ammonium" are used somewhat interchangeably to refer to the concentration of nitrogen in different forms (e.g. as a function of pH). The conventions in the disclosure are those typically used in wastewater treatment. For example, the "ammonia" or $NH_4$ concentration referred to here is actually the concentration of nitrogen in the ammonia, and is typically also denoted as $NH_4$—N.

Temperature=Temperature (° C.). This is a measured value.

$Airflow_{cur}$=The current airflow to a zone (SCFM). This is a measured value and represents the current airflow to a bioreactor compartment.

$Airflow_{fb,i}$=Intermediate feed-back airflow set point for zone i (SCFM). This is a calculated value for a bioreactor compartment identified by a specific value "i" as described below. The calculation of this value is described in FIG. 4.

$Airflow_{ff,i}$=Intermediate feed-forward airflow set point for zone i (SCFM). This is a calculated value for a bioreactor compartment identified by a specific value "i" as described below. The calculation of this value is described in FIG. 5.

$Airflow_{M1}$=Intermediate airflow set point calculated with feed-back method 1 (SCFM). This is a calculated value. The calculation of this value is described in FIG. 4.

$Airflow_{M2}$=Intermediate airflow set point calculated with feed-back method 2 (SCFM). This is a calculated value. The calculation of this value is described in FIG. 4.

$Airflow_{prev}$=The airflow to a zone during the previous calculation cycle (SCFM). This is a value previously calculated when a method of the disclosure was last performed. However, in some instances, the value may also be measured and recorded. For example, if the airflow system is not functioning properly, such as when the airflow system is known to be outside its control range, the airflow as calculated during the last control cycle might not be used in the methods of the disclosure. In this situation, the measured airflow should be used and not the calculated set point.

$Airflow_{sp}$=Array containing the airflow set points for each zone (SCFM). This array is a data array which stores the airflow set point for each bioreactor compartment as determined by the methods of the disclosure. This data array can be stored by a digital computer or associated equipment and can be used by an aeration control system to adjust the airflow into a bioreactor compartment.

$Airflow_{sp,i}$=Airflow set point for aeration zone i (SCFM). This is a calculated value for a bioreactor compartment identified by a specific value "i" as discussed below. The calculation of this value in the methods of the disclosure is described in FIGS. 3, 4 and 5. In the methods of the disclosure this value can be used to select a new, adjusted airflow rate that provides an aerobic medium in a bioreactor compartment.

$Airflow_{sp,default}$ or $Airflow_{sp,default,i}$=Default airflow set point such as for a bioreactor compartment identified by a specific value "i" as discussed below in the methods of the disclosure. This value corresponds to an airflow rate sufficient to ensure the provision of an aerobic medium in a bioreactor compartment.

$COD_{cur}$=Estimated current chemical oxygen demand concentration, (mg/L). This is a measured value. This value can be empirically determined at a particular point in time using methods well known in the art and then the measured value can be used as an estimate of the current chemical oxygen demand at a later time.

$COD_{pred}$=Predicted chemical oxygen demand concentration, (mg/L). This is a calculated value and can be determined with a differential equation solver using well known in the art.

$DO_{cur}$=Current DO concentration in a zone (mg/L). This is a measured value as discussed above.

$DO_{prev}$=DO concentration in a zone during the previous calculation cycle (mg/L). This is a dissolved oxygen value measured during the previous calculation cycle or that was recorded the last time a method of the disclosure was performed.

i=Counter used to keep track of airflow set point calculations for each zone. "i" is an integer value or other value used to identify each bioreactor compartment in a system in which an aerobic medium is to be produced.

$NH_{4,\,cur}$=Estimated current ammonia concentration (mg/L). This is a measured value. This value can be empirically determined at a particular point in time using methods well known in the art. As discussed above ammonia and ammonium are assumed to be equivalent.

$NH_{4,\,prod}$=Predicted ammonia concentration (mg/L). This is a calculated value and can be determined with a differential equation solver using methods well known in the art.

$NO_{3,\,cur}$=Estimated current nitrate concentration (mg/L). This is a measured value. This value can be empirically determined at a particular point in time using methods well known in the art.

$NO_{3,\,pred}$=Predicted nitrate concentration (mg/L). This is a calculated value and can be determined with a differential equation solver using the methods well known in the art.

OUR=Oxygen Uptake Rate. This is a value determined by any number of methods known in the art for determining $OUR_{current}$ which represents the current OUR in a bioreactor compartment, and $OUR_{pred}$ which represents the predicted OUR in a bioreactor compartment are shown in FIG. 5.

Another aspect of the disclosure is a method for providing an aerobic medium in a bioreactor compartment comprising a) measuring the $NH_4^+$ concentration, dissolved oxygen concentration, medium flow rate, and mixed liquor suspended solids of the medium in the compartment and the airflow into the compartment; b) selecting reference values for the $NH_4^+$ concentration, dissolved oxygen concentration, medium flow rate and mixed liquor suspended solids of the medium in the compartment and the airflow into the compartment; c) selecting a reference time period; d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment; e) comparing the reference value for the dissolved oxygen concentration and the airflow into the compartment to the measured dissolved oxygen concentration and airflow into the compartment if the measured $NH_4^+$ concentration, medium flow rate, and mixed liquor suspended solids for the medium in the compartment are not equal to the reference value for the $NH_4^+$ concentration, medium flow rate, and mixed liquor suspended solids for the medium in the compartment; f) determining the airflow set point value for the compartment, if the reference values for the dissolved oxygen concentration and the airflow into the compartment and the measured dissolved oxygen concentration and airflow into the compartment are equal, according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period; and g) adjusting the airflow into the compartment to be equal to the airflow set point value; whereby an aerobic medium is provided in the bioreactor compartment. An example of this aspect of the disclosure is shown in the upper right of FIG. 3 and the left side of FIG. 4.

Another aspect of the disclosure is a method for providing an aerobic medium in a bioreactor compartment comprising a) measuring the $NH_4^+$ concentration, dissolved oxygen concentration, medium flow rate, and mixed liquor suspended solids of the medium in the compartment and the airflow into the compartment; b) selecting reference values for the $NH_4^+$ concentration, dissolved oxygen concentration, medium flow rate and mixed liquor suspended solids of the medium in the compartment and the airflow into the compartment; c) selecting a reference time period; d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment; e) comparing the reference value for the dissolved oxygen concentration and the airflow into the compartment to the measured dissolved oxygen concentration and airflow into the compartment if the measured $NH_4^+$ concentration, medium flow rate, and mixed liquor suspended solids for the medium in the compartment are equal to the reference value for the $NH_4^+$ concentration, medium flow rate, and mixed liquor suspended solids for the medium in the compartment; f) determining a first airflow set point value for the compartment, if the reference values for the dissolved oxygen concentration and the airflow into the compartment and the measured dissolved oxygen concentration and airflow into the compartment are equal, according to the formula:

$$Airflow_{fb,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment, if the reference values for the dissolved oxygen concentration and the airflow into the compartment and the measured dissolved oxygen concentration and airflow into the compartment are equal, according to the formula:

$$Airflow_{fb,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period; g) determining a third airflow set point value for the compartment, if the reference values for the dissolved oxygen concentration and the airflow into the compartment and the measured dissolved oxygen concentration and airflow into the compartment are equal, according to the formula:

$$Airflow_{ff,i} = \frac{Airflow_{cur,i} \cdot (\beta \cdot C_s - DO_{cur,i})}{(\beta \cdot C_s - DO_{sp,i})} \cdot \frac{OUR_{pred,i}}{OUR_{current,i}};$$

h) determining the airflow set point value for the compartment using the weighted sum of $Airflow_{fb,i}$ and $Airflow_{ff,i}$; and i) adjusting the airflow into the compartment to be equal to the airflow set point value; whereby an aerobic medium is provided in the bioreactor compartment. An example of this aspect of the disclosure is shown in FIGS. 3, 4 and 5.

Another aspect of the disclosure is a method for providing an aerobic medium in a bioreactor compartment comprising a) measuring the $NH_4^+$ concentration, dissolved oxygen concentration, medium flow rate, and mixed liquor suspended solids of the medium in the compartment and the airflow into the compartment; b) selecting reference values for the $NH_4^+$ concentration, dissolved oxygen concentration, medium flow rate and mixed liquor suspended solids of the medium in the compartment and the airflow into the compartment; c) selecting a reference time period; d) comparing the reference values for the $NH_4$ concentration, medium flow rate, and mixed liquor suspended solids for the medium in the compartment to the measured $NH_4^+$ concentration, medium flow rate, and mixed liquor suspended solids for the medium in the compartment; e) selecting either the performance of step f) if the reference values for the $NH_4^+$ concentration, medium flow rate, and mixed liquor suspended solids for the medium in the compartment are not equal to the measured $NH_4^+$ concentration, medium flow rate, and mixed liquor suspended solids for the medium in the compartment or the performance step g) if the reference values for the $NH_4^+$ concentration, medium flow rate, and mixed liquor suspended solids for the medium in the compartment are equal to the measured $NH_4^+$ concentration, medium flow rate, and mixed liquor suspended solids for the medium in the compartment; and f) comparing the reference value for the dissolved oxygen concentration and the airflow into the compartment to the measured dissolved oxygen concentration and airflow into the compartment and, if the reference values for the dissolved oxygen concentration and the airflow into the compartment and the measured dissolved oxygen concentration and airflow into the compartment are equal, determining a first airflow set point value for the compartment according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period, and adjusting the airflow into the compartment to be equal to the first airflow set point when the reference value for the dissolved oxygen concentration in the compartment is unchanged during the reference time period or to be equal to the second airflow set point when the reference value for the dissolved oxygen concentration in the compartment has changed during the reference time period; or g) comparing the reference value for the dissolved oxygen concentration and the airflow into the compartment to the measured dissolved oxygen concentration and airflow into the compartment and, if the reference values for the dissolved oxygen concentration and the airflow into the compartment and the measured dissolved oxygen concentration and airflow into the compartment are equal, determining a first airflow set point value for the compartment according to the formula:

$$Airflow_{fb,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment according to the formula:

$$Airflow_{fb,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period, and determining a third airflow set point value for the compartment according to the formula:

$$Airflow_{ff,i} = \frac{Airflow_{cur,i} \cdot (\beta \cdot C_s - DO_{cur,i})}{(\beta \cdot C_s - DO_{sp,i})} \cdot \frac{OUR_{pred,i}}{OUR_{current,i}}$$

and
determining a fourth airflow set point value for the compartment using the weighted sum of $Airflow_{fb,i}$ and $Airflow_{ff,i}$; when the reference value for the dissolved oxygen concentration in the compartment has changed during the reference time period, and adjusting the airflow into the compartment to be equal to the fourth airflow set point value; whereby an aerobic medium is provided in the bioreactor compartment. An example of this aspect of the disclosure is shown in FIGS. 3, 4 and 5.

In one embodiment of the disclosure, step f) and step g) further comprise adjusting the airflow into the compartment to be equal to a predetermined airflow value sufficient to maintain an aerobic medium if the reference values for the dissolved oxygen concentration and the airflow into the compartment and the measured dissolved oxygen concentration and airflow into the compartment are not equal; whereby an aerobic medium is provided in the bioreactor compartment. An example of this embodiment of the disclosure is shown in the upper right of FIG. 3 and the left side of FIG. 3.

Another aspect of the disclosure is a method for providing an aerobic medium in a bioreactor compartment comprising a) determining the airflow set point value for the compartment according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})};$$

and b) adjusting the airflow into the compartment to be equal to the airflow set point value; whereby an aerobic medium is provided in the bioreactor compartment. An example of this aspect of the disclosure is shown on the right side of FIG. 5.

Another aspect of the disclosure is a method for providing an aerobic medium in a bioreactor compartment comprising a) determining the airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})};$$

and b) adjusting the airflow into the compartment to be equal to the airflow set point value; whereby an aerobic medium is provided in the bioreactor compartment. An example of this aspect of the disclosure is shown on the left side of FIG. 5.

Another aspect of the disclosure is a method for providing an aerobic medium in a bioreactor compartment comprising a) measuring the dissolved oxygen concentration of the medium in the compartment; b) selecting a reference value for the dissolved oxygen concentration of the medium in the compartment; d) selecting a reference time period; e) comparing the reference value for the dissolved oxygen concentration to the measured dissolved oxygen concentration of the medium in the compartment; f) determining a first airflow set point value for the compartment according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period; and g) adjusting the airflow into the compartment to be equal to the first airflow set point value when the reference value for the dissolved oxygen concentration in the compartment is unchanged during the reference time period, or adjusting the airflow into the compartment to be equal to the first airflow set point value when the reference value for the dissolved oxygen concentration in the compartment has changed during the reference time period; whereby an aerobic medium is provided in the bioreactor compartment. An example of this aspect of the disclosure is shown in FIG. 4.

Another aspect of the disclosure is a method for providing an aerobic medium in a bioreactor compartment comprising the steps of a) selecting reference values for the dissolved oxygen concentration and the airflow into the compartment; b) selecting a predetermined airflow value sufficient to maintain an aerobic medium; c) measuring the dissolved oxygen concentration and airflow into the compartment; d) comparing the reference values for the dissolved oxygen concentration and the airflow into the compartment to the measured dissolved oxygen concentration and airflow into the compartment; e) adjusting the airflow into the compartment to be equal to the predetermined airflow value if the reference values for the dissolved oxygen concentration and the airflow into the compartment, and the measured dissolved oxygen concentration and airflow into the compartment are not equal; whereby an aerobic medium is provided in the bioreactor compartment. An example of this aspect of the disclosure is shown in the upper right of FIG. 3 and the left side of FIG. 3.

Figure 6:
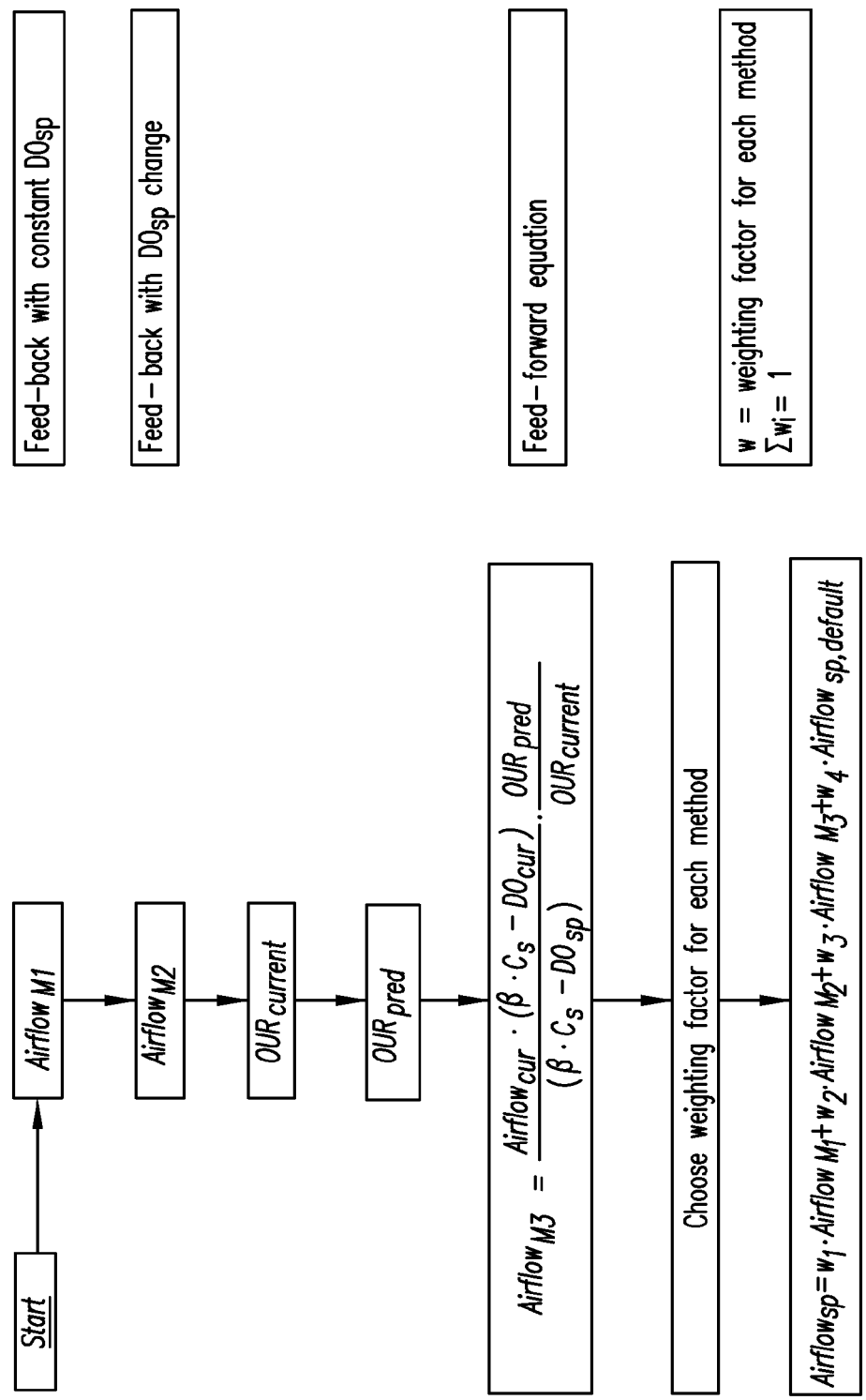
FIG. 6 shows a simplified method of the disclosure for providing an aerobic medium in a bioreactor compartment of a system comprising multiple aerobic bioreactor compartments.

Another aspect of the disclosure is a method for providing an aerobic medium in a bioreactor compartment comprising a) determining an airflow set point value according to the formula: $Airflow_{sp} = w_1 \cdot Airflow_{M1} + w_2 \cdot Airflow_{M2} + w_3 \cdot Airflow_{M3} + w_4 \cdot Airflow_{sp, default}$; and
b) adjusting the airflow into the compartment to be equal to the airflow set point value; whereby an aerobic medium is provided in the bioreactor compartment. An example of this aspect of the disclosure as shown in FIG. 6.

In the methods of this aspect, the weighting factors $w_1$, $w_2$, $w_3$ and $w_4$ can be selected according to the operating parameters of a particular bioreactor such as a wastewater treatment system. Specifically, the $NH_4^+$ concentration, dissolved oxygen concentration, medium flow rate, and mixed liquor suspended solids of the medium in the compartment and the airflow into the compartment can be measured and compared to reference values for the $NH_4^+$ concentration, dissolved oxygen concentration, medium flow rate and mixed liquor suspended solids of the medium in the compartment and the airflow into the compartment. Appropriate values for $w_1$, $w_2$, $w_3$ and $w_4$ can then be selected on the basis of this comparison.

Importantly, weighting factor values can be selected according to the decision point criteria indicated in FIGS. 3 and 4 for each of the five different possible cases. Optimal values for the weighting factors $w_1$, $w_2$, $w_3$ and $w_4$ are readily determined by those of ordinary skill in the art. The values of the weighting factors $w_1$, $w_2$, $w_3$ and $w_4$ may also be equal. Typically, the sum of the values of the weighting factors is equal to 1 as indicated in FIG. 6. Those of ordinary skill in the art will also recognize other appropriate values for the weighting factors $w_1$, $w_2$, $w_3$ and $w_4$ based on the operating characteristics and design of a particular system comprising a bioreactor compartment, such as a wastewater treatment system.

In another embodiment of the disclosure $Airflow_1$ for the compartment is determined according to the formula:

$$Airflow_1 = \frac{(Airflow_{cur} \cdot (\beta \cdot C_s - DO_{cur}))^2}{(\beta \cdot C_s - DO_{sp}) \cdot Airflow_{prev} \cdot (\beta \cdot C_s - DO_{prev})};$$

$Airflow_2$ for the compartment is determined according to the formula:

$$Airflow_2 = \frac{Airflow_{cur} \cdot (\beta \cdot C_s - DO_{cur})}{(\beta \cdot C_s - DO_{sp})} \cdot \frac{DO_{sp} \cdot (K_{DO} + DO_{cur})}{DO_{cur} \cdot (K_{DO} + DO_{sp})};$$

$Airflow_3$ for the compartment is determined according to the formula:

$$Airflow_3 = \frac{Airflow_{cur} \cdot (\beta \cdot C_s - DO_{cur})}{(\beta \cdot C_s - DO_{sp})} \cdot \frac{OUR_{pred}}{OUR_{current}};$$

$Airflow_{default}$ has a preselected value; and
the sum of the individual values selected for the weighting factors $w_1$, $w_2$, $w_3$ and $w_4$ equals 1.

Another aspect of the disclosure is a method for providing an aerobic medium in a bioreactor compartment comprising a) determining the airflow set point value according to the formula $$Airflow_{sp} = Airflow_{current} \cdot \frac{\beta \cdot C_s - DO_{current}}{\beta \cdot C_s - DO_{sp}} \cdot \left(\frac{OUR_{predicted}}{OUR_{current}}\right); \text{ and}$$

b) adjusting the airflow into the compartment to be equal to the airflow set point value;
whereby an aerobic medium is provided in the bioreactor compartment.

Typically, the methods of the disclosure are also performed in conjunction with a number of other steps. In addition to calculating $$Airflow_{sp} = Airflow_{current} \cdot \frac{\beta \cdot C_s - DO_{current}}{\beta \cdot C_s - DO_{sp}} \cdot \frac{OUR_{predicted}}{OUR_{current}},$$

these steps include measuring relevant parameters (e.g. $NH_4$, Flow, DO, airflow, temperature, MLSS), calculating $C_s$, calculating $$\frac{OUR_{predicted}}{OUR_{current}} \text{ (i.e. the OUR Ratio),}$$

repeating the prior steps for each compartment in an bioreactor such as an activated sludge wastewater treatment system, transmitting $\Sigma Airflow_{sp}$ (the sum of the calculated $Airflow_{sp}$ values) to the blower control system, and transmitting the calculated $Airflow_{sp}$ for each aerobic compartment or aeration zone to the valve control system for that compartment.

$OUR_{current}$ may be determined using methods that can include, for example, direct measurement of $OUR_{current}$, the use of an activated sludge wastewater treatment bioreactor model such as the ASM1, ASM2, ASM2d, ASM3, ASM4 or other models and correlation from other measured parameters such as DO, Airflow, $NH_4$, and $NO_3$. $OUR_{predicted}$ may be determined using methods that can include, for example, interpolation from existing data, correlation from other measured parameters, and use of an activated sludge wastewater treatment bioreactor model such as the ASM1, ASM2, ASM2d, ASM3, ASM4 or other models. Additional examples of activated sludge wastewater treatment bioreactor models include the ASDM general model in BioWin, TUD, Mantis, and the Newgeneral models which are all well known in the art. Importantly, these models can be refined to more accurately model the configuration and physical characteristics of a particular wastewater treatment bioreactor (e.g. by selecting a particular settling model etc.). Those of ordinary skill in the art will also recognize a variety of other different methods and models suitable for determining $OUR_{current}$ and $OUR_{predicted}$ as well as combinations of these that are suitable for use in the disclosed methods.

In another embodiment of the disclosure the value of $$\left(\frac{OUR_{predicted}}{OUR_{current}}\right)$$

for the compartment is determined using an $OUR_{current}$ value determined by the use of at least one technique selected from the group consisting of direct measurement, a mathematical model of an activated sludge wastewater treatment bioreactor, and correlation from a measured parameter; and an $OUR_{predicted}$ value determined by the use of at least one technique selected from the group consisting of interpolation from data, a model of an activated sludge wastewater treatment bioreactor, and correlation from a measured parameter. Importantly, interpolation and the other recited methods are well known and routinely used by those of ordinary skill in the art.

In another embodiment of the disclosure the model is selected from the group consisting of the ASM1 model, the ASM2 model, the ASM2D model, the ASM3 model, and the ASM4 model.

The methods of the disclosure may further comprise the steps of a) repeating the method for each compartment in a bioreactor in which an aerobic environment is to be maintained; b) determining the sum of the airflow values sufficient to maintain an aerobic environment in each compartment; c) sending the sum of the airflow values to a blower controller; and d) sending each airflow value sufficient to maintain an aerobic environment in each compartment to an individual airflow controller for adjusting the airflow into each compartment.

The methods may be repeated at a user selected time interval.

The time interval may be from 5 minutes to 30 minutes.

Figure 2:
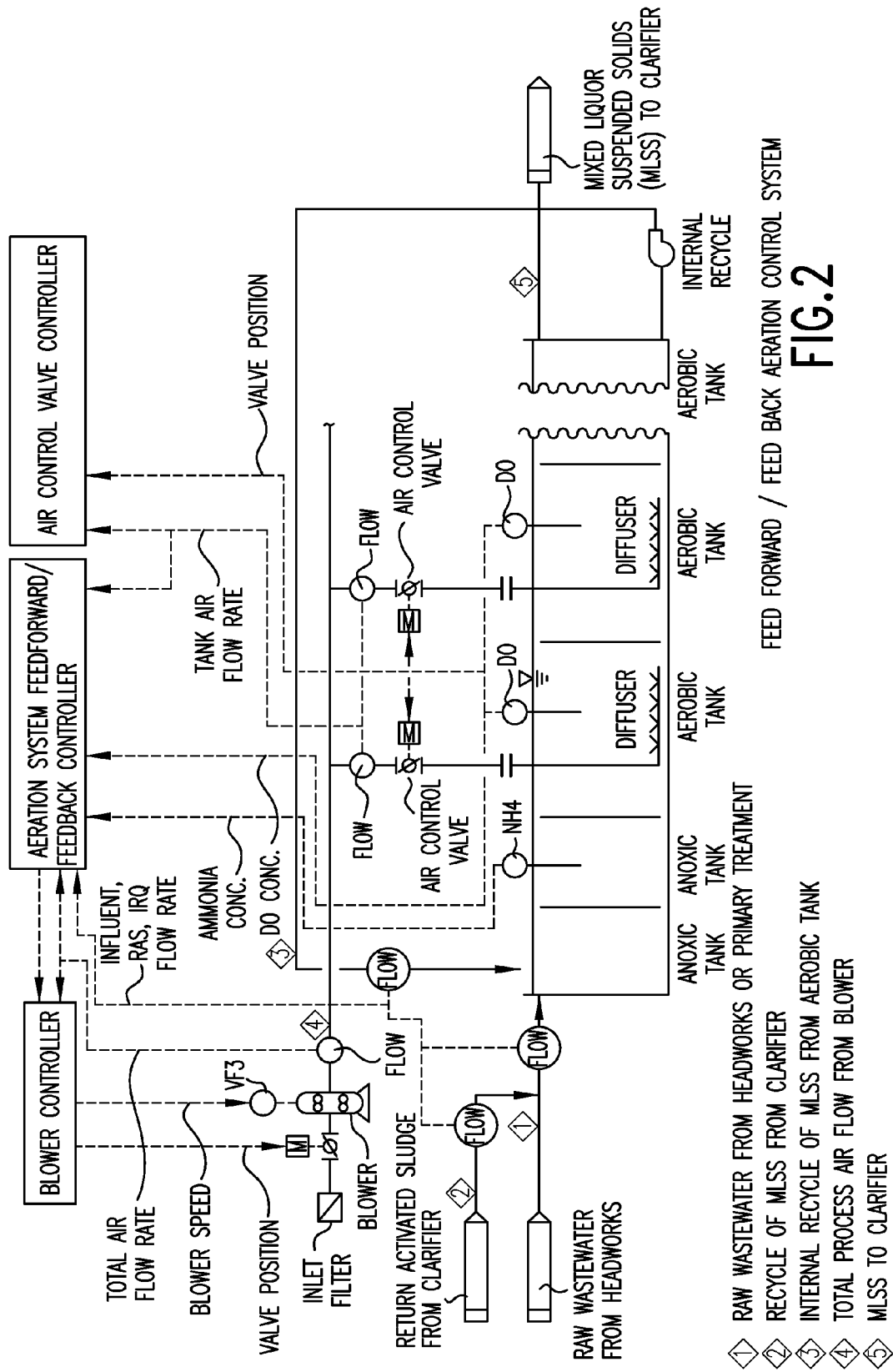
FIG. 2 shows a feed-back\feed-forward based aeration control system that performs the methods of the disclosure and a bioreactor based wastewater treatment system of the disclosure.

Another aspect of the disclosure is a system comprising at least one aerobic bioreactor compartment, an aeration system, and an aeration system controller which performs a method of the disclosure. An example this embodiment of the disclosure and of one possible configuration of such a system is shown in FIG. 2.

An aeration system can comprise a blower or other means, such as tanks containing pressurized gases or condensed gases, for delivering a stream of a gas, such as air, containing oxygen. For example, blowers can be of the centrifugal or positive displacement type. Blowers provide low pressure (e.g. 5-12 psi) air needed to supply oxygen to provide an aerobic medium in a bioreactor compartment. The blowers of the aeration system can be, for example, centrifugal or positive displacement type blowers. Typically, the blower speed or an inlet valve can be controlled by an aeration system controller to provide an airflow equal to the sum of the airflow set points determined by the methods of the disclosure.

Aeration systems can also comprise one or more means of fluid communication, such as a pipe or other channel, for delivering oxygen to a bioreactor compartment. Diffusers, to facilitate mass transfer, may also be used at the terminal portions of the means for delivering an oxygen containing gas such as air to a bioreactor compartment. Aeration systems can also contain valves or other means, such as airflow decelerating turbines, for producing a desired airflow into a bioreactor compartment. Such valves or other means for controlling airflow into a bioreactor compartment are often necessary as most blowers, or other systems for delivering oxygen, produce an airflow that would be higher than desired into a given bioreactor compartment. For example, butterfly type valves with electrical actuators to control the positioning of the valve are the most commonly used air control valves in the aeration systems of wastewater treatment systems. Importantly, such air control valves, or other means, can distribute the air to a bioreactor compartment based on the adjusted airflow sufficient to produce an aerobic medium in a bioreactor compartment as determined by a method of the disclosure.

An aeration system controller can comprise an digital computer, such as a personal computer (PC) or programmable logic controller (PLC), that performs the methods of the disclosure.

The aeration system controller can further comprise a blower controller which can control a blower. Such a blower controller can comprise a programmable logic controller that can receive the total airflow requirement from the aeration system controller and control the blower to match the total airflow required.

The aeration system controller may also comprise an air control valve controller. Such an air control valve controller can comprise a programmable logic controller that receives the individual airflow requirement for each bioreactor compartment from the aeration system controller that performs the methods of the disclosure. In response to this information, the air control valve controller adjusts the valves, or other means, to produce a desired airflow into a bioreactor compartment of the system.

Another aspect of the disclosure is a system wherein the bioreactor compartment comprises activated sludge. In the art, "activated sludge" is a complex, catalytically active biological material produced by activated sludge plants which is largely composed of a number of different microorganisms. Typically, the majority of these microorganisms are bacteria and protozoans as well as fungi in some instances.

Another aspect of the disclosure is a system wherein the aeration system controller is a digital computer.

Another aspect of the disclosure is a system wherein the digital computer is selected from the group consisting of a personal computer and a programmable logic controller.

From the disclosure now being fully described, it will be apparent to one of ordinary skill in the art that many changes and modifications can be made thereto without departing from the spirit or scope of the appended claims.

What is claimed is:

1. A method for providing an aerobic medium in a bioreactor compartment comprising:
   a) measuring the $NH_4^+$ concentration, dissolved oxygen concentration, medium flow rate, and mixed liquor suspended solids of the medium in the compartment and the airflow into the compartment;

b) selecting reference values for the $NH_4^+$ concentration, dissolved oxygen concentration, medium flow rate and mixed liquor suspended solids of the medium in the compartment and the airflow into the compartment;
c) selecting a reference time period;
d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment;
e) comparing the reference value for the dissolved oxygen concentration and the airflow into the compartment to the measured dissolved oxygen concentration and airflow into the compartment if the measured $NH_4^+$ concentration, medium flow rate, and mixed liquor suspended solids for the medium in the compartment are not equal to the reference value for the $NH_4^+$ concentration, medium flow rate, and mixed liquor suspended solids for the medium in the compartment;
f) determining the airflow set point value for the compartment, if the reference values for the dissolved oxygen concentration and the airflow into the compartment and the measured dissolved oxygen concentration and airflow into the compartment are equal, according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period; and
g) adjusting the airflow into the compartment to be equal to the airflow set point value;
whereby an aerobic medium is provided in the bioreactor compartment.

2. A method for providing an aerobic medium in a bioreactor compartment comprising:
a) measuring the $NH_4^+$ concentration, dissolved oxygen concentration, medium flow rate, and mixed liquor suspended solids of the medium in the compartment and the airflow into the compartment;
b) selecting reference values for the $NH_4^+$ concentration, dissolved oxygen concentration, medium flow rate and mixed liquor suspended solids of the medium in the compartment and the airflow into the compartment;
c) selecting a reference time period;
d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment;
e) comparing the reference value for the dissolved oxygen concentration and the airflow into the compartment to the measured dissolved oxygen concentration and airflow into the compartment if the measured $NH_4^+$ concentration, medium flow rate, and mixed liquor suspended solids for the medium in the compartment are not equal to the reference value for the $NH_4^+$ concentration, medium flow rate, and mixed liquor suspended solids for the medium in the compartment;
f) determining the airflow set point value for the compartment, if the reference values for the dissolved oxygen concentration and the airflow into the compartment and the measured dissolved oxygen concentration and airflow into the compartment are equal, according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period; and
g) adjusting the airflow into the compartment to be equal to the airflow set point value;
whereby an aerobic medium is provided in the bioreactor compartment.

3. A method for providing an aerobic medium in a bioreactor compartment comprising:
a) measuring the $NH_4^+$ concentration, dissolved oxygen concentration, medium flow rate, and mixed liquor suspended solids of the medium in the compartment and the airflow into the compartment;
b) selecting reference values for the $NH_4^+$ concentration, dissolved oxygen concentration, medium flow rate and mixed liquor suspended solids of the medium in the compartment and the airflow into the compartment;
c) selecting a reference time period;
d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment;
e) comparing the reference value for the dissolved oxygen concentration and the airflow into the compartment to the measured dissolved oxygen concentration and airflow into the compartment if the measured $NH_4^+$ concentration, medium flow rate, and mixed liquor suspended solids for the medium in the compartment are equal to the reference value for the $NH_4^+$ concentration, medium flow rate, and mixed liquor suspended solids for the medium in the compartment;
f) determining a first airflow set point value for the compartment, if the reference values for the dissolved oxygen concentration and the airflow into the compartment and the measured dissolved oxygen concentration and airflow into the compartment are equal, according to the formula:

$$Airflow_{fb,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

-continued and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment, if the reference values for the dissolved oxygen concentration and the airflow into the compartment and the measured dissolved oxygen concentration and airflow into the compartment are equal, according to the formula:

$$Airflow_{fb,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period;

g) determining a third airflow set point value for the compartment, if the reference values for the dissolved oxygen concentration and the airflow into the compartment and the measured dissolved oxygen concentration and airflow into the compartment are equal, according to the formula:

$$Airflow_{ff,i} = \frac{Airflow_{cur,i} \cdot (\beta \cdot C_s - DO_{cur,i})}{(\beta \cdot C_s - DO_{sp,i})} \cdot \frac{OUR_{pred,i}}{OUT_{current,i}};$$

h) determining the airflow set point value for the compartment using the weighted sum of $Airflow_{fb,i}$ and $Airflow_{ff,i}$; and i) adjusting the airflow into the compartment to be equal to the airflow set point value;

whereby an aerobic medium is provided in the bioreactor compartment.

4. A method for providing an aerobic medium in a bioreactor compartment comprising:

a) measuring the $NH_4^+$ concentration, dissolved oxygen concentration, medium flow rate, and mixed liquor suspended solids of the medium in the compartment and the airflow into the compartment;

b) selecting reference values for the $NH_4^+$ concentration, dissolved oxygen concentration, medium flow rate and mixed liquor suspended solids of the medium in the compartment and the airflow into the compartment;

c) selecting a reference time period;

d) comparing the reference values for the $NH_4^+$ concentration, medium flow rate, and mixed liquor suspended solids for the medium in the compartment to the measured $NH_4^+$ concentration, medium flow rate, and mixed liquor suspended solids for the medium in the compartment;

e) selecting either the performance of step if the reference values for the $NH_4^+$ concentration, medium flow rate, and mixed liquor suspended solids for the medium in the compartment are not equal to the measured $NH_4^+$ concentration, medium flow rate, and mixed liquor suspended solids for the medium in the compartment or the performance step g) if the reference values for the $NH_4^+$ concentration, medium flow rate, and mixed liquor suspended solids for the medium in the compartment are equal to the measured $NH_4^+$ concentration, medium flow rate, and mixed liquor suspended solids for the medium in the compartment; and f) comparing the reference value for the dissolved oxygen concentration and the airflow into the compartment to the measured dissolved oxygen concentration and airflow into the compartment and, if the reference values for the dissolved oxygen concentration and the airflow into the compartment and the measured dissolved oxygen concentration and airflow into the compartment are equal, determining a first airflow set point value for the compartment according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period, or determining a second airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period, and adjusting the airflow into the compartment to be equal to the first airflow set point when the reference value for the dissolved oxygen concentration in the compartment is unchanged during the reference time period or to be equal to the second airflow set point when the reference value for the dissolved oxygen concentration in the compartment has changed during the reference time period;

or g) comparing the reference value for the dissolved oxygen concentration and the airflow into the compartment to the measured dissolved oxygen concentration and airflow into the compartment and, if the reference values for the dissolved oxygen concentration and the airflow into the compartment and the measured dissolved oxygen concentration and airflow into the compartment are equal, determining a first airflow set point value for the compartment according to the formula:

$$Airflow_{fb,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period,
or
determining a second airflow set point value for the compartment according to the formula:

$$Airflow_{fb,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period,
and
determining a third airflow set point value for the compartment according to the formula:

$$Airflow_{ff,i} = \frac{Airflow_{cur,i} \cdot (\beta \cdot C_s - DO_{cur,i})}{(\beta \cdot C_s - DO_{sp,i})} \cdot \frac{OUR_{pred,i}}{OUR_{current,i}}$$

and
determining a fourth airflow set point value for the compartment using the weighted sum of $Airflow_{fb,i}$ and $Airflow_{ff,i}$ when the reference value for the dissolved oxygen concentration in the compartment has changed during the reference time period,
and adjusting the airflow into the compartment to be equal to the fourth airflow set point value;
whereby an aerobic medium is provided in the bioreactor compartment.

5. The method of claim 4 wherein step f) and step g) further comprise adjusting the airflow into the compartment to be equal to a predetermined airflow value sufficient to maintain an aerobic medium
if
the reference values for the dissolved oxygen concentration and the airflow into the compartment and the measured dissolved oxygen concentration and airflow into the compartment are not equal;
whereby an aerobic medium is provided in the bioreactor compartment.

6. A method for providing an aerobic medium in a bioreactor compartment comprising:
a) determining the airflow set point value for the compartment according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})};$$

and
b) adjusting the airflow into the compartment to be equal to the airflow set point value;
whereby an aerobic medium is provided in the bioreactor compartment.

7. A method for providing an aerobic medium in a bioreactor compartment comprising:
a) determining the airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})};$$

and
b) adjusting the airflow into the compartment to be equal to the airflow set point value;
whereby an aerobic medium is provided in the bioreactor compartment.

8. A method for providing an aerobic medium in a bioreactor compartment comprising:
a) measuring the dissolved oxygen concentration of the medium in the compartment;
b) selecting a reference value for the dissolved oxygen concentration of the medium in the compartment;
d) selecting a reference time period;
e) comparing the reference value for the dissolved oxygen concentration to the measured dissolved oxygen concentration of the medium in the compartment;
f) determining a first airflow set point value for the compartment according to the formula:

$$Airflow_{sp,i} = \frac{Airflow_{M1} + Airflow_{M2}}{2}$$

where $$Airflow_{M1} = \frac{(Airflow_{cur,i} \cdot (\beta \cdot C_s - DO_{cur,i}))^2}{(\beta \cdot C_s - DO_{sp,i}) \cdot Airflow_{prev,i} \cdot (\beta \cdot C_s - DO_{prev,i})}$$

and $$Airflow_{M2} = \frac{Airflow_{cur,i} \cdot (\beta \cdot C_s - DO_{cur_i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment is unchanged during the reference time period,
or
determining a second airflow set point value for the compartment according to the formula:

$$Airflow_{sp,i} = \frac{Airflow_{cur,i} \cdot (\beta \cdot C_s - DO_{cur,i})}{(\beta \cdot C_s - DO_{sp,i})} \cdot \frac{DO_{sp,i} \cdot (K_{DO} + DO_{cur,i})}{DO_{cur,i} \cdot (K_{DO} + DO_{sp,i})}$$

when the reference value for the dissolved oxygen concentration in the compartment has changed during the reference time period; and g) adjusting the airflow into the compartment to be equal to the first airflow set point value when the reference value for the dissolved oxygen concentration in the compartment is unchanged during the reference time period, or adjusting the airflow into the compartment to be equal to the first airflow set point value when the reference value for the dissolved oxygen concentration in the compartment has changed during the reference time period;

whereby an aerobic medium is provided in the bioreactor compartment.

9. A method for providing an aerobic medium in a bioreactor compartment comprising the steps of:

a) selecting reference values for the dissolved oxygen concentration and the airflow into the compartment;

b) selecting a predetermined airflow value sufficient to maintain an aerobic medium;

c) measuring the dissolved oxygen concentration and airflow into the compartment;

d) comparing the reference values for the dissolved oxygen concentration and the airflow into the compartment to the measured dissolved oxygen concentration and airflow into the compartment;

e) adjusting the airflow into the compartment to be equal to the predetermined airflow value if the reference values for the dissolved oxygen concentration and the airflow into the compartment, and the measured dissolved oxygen concentration and airflow into the compartment are not equal;

whereby an aerobic medium is provided in the bioreactor compartment.

10. A method for providing an aerobic medium in a bioreactor compartment comprising:

a) determining an airflow set point value according to the formula:

$$Airflow_{sp} = w_1 \cdot Airflow_{M1} + w_2 \cdot Airflow_{M2} + w_3 \cdot Airflow_{M3} + w_4 \cdot Airflow_{sp,\, default};$$

and b) adjusting the airflow into the compartment to be equal to the airflow set point;

whereby an aerobic medium is provided in the bioreactor compartment.

11. The method of claim 10 wherein:

a) Airflow$_1$ for the compartment is determined according to the formula:

$$Airflow_1 = \frac{(Airflow_{cur} \cdot (\beta \cdot C_s - DO_{cur}))^2}{(\beta \cdot C_s - DO_{sp}) \cdot Airflow_{prev} \cdot (\beta \cdot C_s - DO_{prev})};$$

b) Airflow$_2$ for the compartment is determined according to the formula:

$$Airflow_2 = \frac{Airflow_{cur} \cdot (\beta \cdot C_s - DO_{cur})}{(\beta \cdot C_s - DO_{sp})} \cdot \frac{DO_{sp} \cdot (K_{DO} + DO_{cur})}{DO_{cur} \cdot (K_{DO} + DO_{sp})};$$

c) Airflow$_3$ for the compartment is determined according to the formula:

$$Airflow_3 = \frac{Airflow_{cur} \cdot (\beta \cdot C_s - DO_{cur})}{(\beta \cdot C_s - DO_{sp})} \cdot \frac{OUR_{pred}}{OUR_{current}};$$

d) Airflow$_{sp,\, default}$ has a preselected value; and e) the sum of the individual values selected for the weighting factors $w_1$, $w_2$, $w_3$ and $w_4$ equals 1.

12. A method for providing an aerobic medium in a bioreactor compartment comprising:

a) determining the airflow set point value according to the formula:

$$Airflow_{sp} = Airflow_{current} \cdot \frac{\beta \cdot C_s - DO_{current}}{\beta \cdot C_s - DO_{sp}} \cdot \left(\frac{OUR_{predicted}}{OUT_{current}}\right);$$

and b) adjusting the airflow into the compartment to be equal to the airflow set point value;

whereby an aerobic medium is provided in the bioreactor compartment.

13. The method of claim 12 wherein the value of $$\left(\frac{OUR_{predicted}}{OUR_{current}}\right)$$

for the compartment is determined using:

a) an OUR$_{current}$ value determined by the use of at least one technique selected from the group consisting of direct measurement, a mathematical model of an activated sludge wastewater treatment bioreactor, and correlation from a measured parameter; and b) an OUR$_{predicted}$ value determined by the use of at least one technique selected from the group consisting of interpolation from data, a model of an activated sludge wastewater treatment bioreactor, and correlation from a measured parameter.

14. The method of claim 13 wherein the model is selected from the group consisting of the ASM1 model, the ASM2 model, the ASM2D model, the ASM3 model, and the ASM4 model.

15. The method of claim 1 further comprising:

a) repeating the method for each compartment in a bioreactor in which an aerobic environment is to be maintained;

b) determining the sum of the airflow values sufficient to maintain an aerobic environment in each compartment;

c) sending the sum of the airflow values to a blower controller; and d) sending each airflow value sufficient to maintain an aerobic environment in each compartment to an individual airflow controller for adjusting the airflow into each compartment.

16. The method of claim 15 wherein the method is repeated at a user selected time interval.

17. The method of claim 16 wherein the time interval is from 5 minutes to 30 minutes.

18. The method of claim 10 further comprising:

a) repeating the method for each compartment in a bioreactor in which an aerobic environment is to be maintained;

b) determining the sum of the airflow values sufficient to maintain an aerobic environment in each compartment;
c) sending the sum of the airflow values to a blower controller; and
d) sending each airflow value sufficient to maintain an aerobic environment in each compartment to an individual airflow controller for adjusting the airflow into each compartment.

19. The method of claim 18 wherein the method is repeated at a user selected time interval.

20. The method of claim 19 wherein the time interval is from 5 minutes to 30 minutes.

* * * * *